US008992205B2

(12) United States Patent
Ederer et al.

(10) Patent No.: US 8,992,205 B2
(45) Date of Patent: Mar. 31, 2015

(54) DEVICE FOR THE LAYER-WISE PRODUCTION OF PATTERNS

(75) Inventors: Ingo Ederer, Geltendorf (DE); Andreas Hartman, Stadtbergen (DE)

(73) Assignee: Voxeijet AG, Friedberg (DE)

( * ) Notice: Subject to any disclaimer, the term of this patent is extended or adjusted under 35 U.S.C. 154(b) by 684 days.

(21) Appl. No.: 12/681,957

(22) PCT Filed: Oct. 6, 2008

(86) PCT No.: PCT/DE2008/001603
§ 371 (c)(1),
(2), (4) Date: Apr. 7, 2010

(87) PCT Pub. No.: WO2009/052774
PCT Pub. Date: Apr. 30, 2009

(65) Prior Publication Data
US 2010/0212584 A1    Aug. 26, 2010

(30) Foreign Application Priority Data

Oct. 23, 2007    (DE) .......................... 10 2007 050 953

(51) Int. Cl.
*B05C 11/00*    (2006.01)
*B41J 2/01*     (2006.01)
*B29C 41/12*    (2006.01)
(Continued)

(52) U.S. Cl.
CPC ............. *B29C 67/0081* (2013.01); *B29C 41/02* (2013.01); *B05C 19/04* (2013.01); *B29C 67/0085* (2013.01); *B29C 67/0059* (2013.01); *B05C 13/00* (2013.01); *B05C 11/02* (2013.01);
(Continued)

(58) Field of Classification Search
None
See application file for complete search history.

(56) References Cited

U.S. PATENT DOCUMENTS 3,239,080 A * 3/1966 Coromp ....................... 414/541
4,247,508 A   1/1981 Housholder
(Continued)

FOREIGN PATENT DOCUMENTS

AU          720255 B2    5/2000
DE          4300478      8/1994
(Continued)

OTHER PUBLICATIONS

US 4,937,420, 6/1990, Deckard (withdrawn).
(Continued)

*Primary Examiner* — Dah-Wei D Yuan
*Assistant Examiner* — Binu Thomas
(74) *Attorney, Agent, or Firm* — The Dobrusin Law Firm, PC

(57) ABSTRACT

The instant invention relates to a device and method for manufacturing patterns in layers. The device includes an auxiliary frame, a vertically displaceable build platform, a dispensing device for applying a binder material onto the build platform, a mounting platform, a mounting platform, and a spreader device for applying particulate material. The mounting platform preferably is connected to the auxiliary frame and includes a cut-out for the build platform. The dispensing device, the spreader device, and the build platform are connected to the mounting platform, so that the dispensing device, the spreader device and the build platform are cable of being mounted, adjusted, and wired to the mounting platform while located outside the auxiliary frame.

22 Claims, 5 Drawing Sheets

(51) Int. Cl.
  *B29C 41/02* (2006.01)
  *B29C 67/00* (2006.01)
  *B05C 19/04* (2006.01)
  *B05C 13/00* (2006.01)
  *B05C 11/02* (2006.01)
  *B05C 15/00* (2006.01)
  *B41J 3/407* (2006.01)
  *B28D 1/00* (2006.01)

(52) U.S. Cl.
  CPC ............. B05C 15/00 (2013.01); *B41J 3/4073* (2013.01); *B28D 1/001* (2013.01)
  USPC ............ 425/375; 118/56; 118/305; 118/308; 118/323; 347/37; 700/119; 264/113; 264/308; 264/460

(56) References Cited

U.S. PATENT DOCUMENTS

| | | | |
|---|---|---|---|
| 4,369,025 A | 1/1983 | Von Der Weid | |
| 4,575,330 A | 3/1986 | Hull | |
| 4,665,492 A | 5/1987 | Masters | |
| 4,752,352 A | 6/1988 | Feygin | |
| 4,863,538 A | 9/1989 | Deckard | |
| 4,938,816 A | 7/1990 | Beaman et al. | |
| 4,944,817 A | 7/1990 | Bourell et al. | |
| 5,017,753 A | 5/1991 | Deckard | |
| 5,053,090 A | 10/1991 | Beaman et al. | |
| 5,059,266 A | 10/1991 | Yamane et al. | |
| 5,076,869 A | 12/1991 | Bourell et al. | |
| 5,127,037 A | 6/1992 | Bynum | |
| 5,132,143 A | 7/1992 | Deckard | |
| 5,134,569 A | 7/1992 | Masters | |
| 5,136,515 A | 8/1992 | Helinski | |
| 5,140,937 A | 8/1992 | Yamane et al. | |
| 5,147,587 A | 9/1992 | Marcus et al. | |
| 5,149,548 A | 9/1992 | Yamane et al. | |
| 5,155,324 A | 10/1992 | Deckard et al. | |
| 5,156,697 A | 10/1992 | Bourell et al. | |
| 5,182,170 A | 1/1993 | Marcus et al. | |
| 5,204,055 A | 4/1993 | Sachs et al. | |
| 5,216,616 A | 6/1993 | Masters | |
| 5,248,456 A | 9/1993 | Evans, Jr. et al. | |
| 5,252,264 A | 10/1993 | Forderhase et al. | |
| 5,284,695 A | 2/1994 | Barlow et al. | |
| 5,296,062 A | 3/1994 | Bourell et al. | |
| 5,316,580 A | 5/1994 | Deckard | |
| 5,340,656 A | 8/1994 | Sachs et al. | |
| 5,342,919 A | 8/1994 | Dickens, Jr. et al. | |
| 5,352,405 A | 10/1994 | Beaman et al. | |
| 5,354,414 A | 10/1994 | Feygin | |
| 5,382,308 A | 1/1995 | Bourell et al. | |
| 5,387,380 A | 2/1995 | Cima et al. | |
| 5,431,967 A | 7/1995 | Manthiram et al. | |
| 5,482,659 A | 1/1996 | Sauerhoefer | |
| 5,490,962 A | 2/1996 | Cima et al. | |
| 5,506,607 A * | 4/1996 | Sanders et al. | 347/1 |
| 5,555,176 A | 9/1996 | Menhennett et al. | |
| 5,573,055 A | 11/1996 | Melling et al. | |
| 5,597,589 A | 1/1997 | Deckard | |
| 5,616,294 A | 4/1997 | Deckard | |
| 5,639,070 A | 6/1997 | Deckard | |
| 5,639,402 A | 6/1997 | Barlow et al. | |
| 5,647,931 A | 7/1997 | Retallick et al. | |
| 5,658,412 A | 8/1997 | Retallick et al. | |
| 5,730,925 A | 3/1998 | Mattes et al. | |
| 5,740,051 A | 4/1998 | Sanders, Jr. et al. | |
| 5,753,274 A | 5/1998 | Wilkening et al. | |
| 5,807,437 A | 9/1998 | Sachs et al. | |
| 5,851,465 A | 12/1998 | Bredt | |
| 5,902,441 A | 5/1999 | Bredt et al. | |
| 5,902,537 A | 5/1999 | Almquist et al. | |
| 5,943,235 A | 8/1999 | Earl et al. | |
| 6,007,318 A | 12/1999 | Russell et al. | |
| 6,036,777 A | 3/2000 | Sachs | |
| 6,042,774 A | 3/2000 | Wilkening et al. | |
| 6,048,188 A | 4/2000 | Hull et al. | |
| 6,116,517 A | 9/2000 | Heinzl et al. | |
| 6,133,353 A | 10/2000 | Bui et al. | |
| 6,146,567 A | 11/2000 | Sachs et al. | |
| 6,147,138 A | 11/2000 | Hochsmann et al. | |
| 6,155,331 A | 12/2000 | Langer et al. | |
| 6,165,406 A | 12/2000 | Jang et al. | |
| 6,193,922 B1 | 2/2001 | Ederer | |
| 6,217,816 B1 | 4/2001 | Tang | |
| 6,259,962 B1 | 7/2001 | Gothait | |
| 6,305,769 B1 | 10/2001 | Thayer et al. | |
| 6,322,728 B1 | 11/2001 | Brodkin et al. | |
| 6,375,874 B1 | 4/2002 | Russell et al. | |
| 6,395,811 B1 | 5/2002 | Nguyen et al. | |
| 6,401,001 B1 | 6/2002 | Jang et al. | |
| 6,403,002 B1 | 6/2002 | Van Der Geest | |
| 6,416,850 B1 | 7/2002 | Bredt et al. | |
| 6,423,255 B1 | 7/2002 | Hoechsmann et al. | |
| 6,436,334 B1 | 8/2002 | Hattori et al. | |
| 6,467,525 B2 | 10/2002 | Herreid et al. | |
| 6,476,122 B1 | 11/2002 | Leyden | |
| 6,500,378 B1 | 12/2002 | Smith | |
| 6,554,600 B1 | 4/2003 | Hofmann et al. | |
| 6,610,429 B2 | 8/2003 | Bredt et al. | |
| 6,733,528 B2 | 5/2004 | Abe et al. | |
| 6,838,035 B1 | 1/2005 | Ederer et al. | |
| 6,896,839 B2 * | 5/2005 | Kubo et al. | 264/460 |
| 7,004,222 B2 | 2/2006 | Ederer et al. | |
| 7,137,431 B2 | 11/2006 | Ederer et al. | |
| 7,204,684 B2 * | 4/2007 | Ederer et al. | 425/174.4 |
| 7,387,359 B2 * | 6/2008 | Hernandez et al. | 347/19 |
| 7,531,117 B2 | 5/2009 | Ederer | |
| 7,665,636 B2 | 2/2010 | Ederer | |
| 7,736,578 B2 | 6/2010 | Ederer | |
| 774,971 A1 | 7/2010 | Hochsmann | |
| 7,767,130 B2 | 8/2010 | Elsner | |
| 2001/0050031 A1 | 12/2001 | Bredt et al. | |
| 2002/0026982 A1 | 3/2002 | Bredt et al. | |
| 2002/0079601 A1 * | 6/2002 | Russell et al. | 425/375 |
| 2002/0111707 A1 | 8/2002 | Li et al. | |
| 2003/0083771 A1 | 5/2003 | Schmidt | |
| 2004/0003738 A1 * | 1/2004 | Imiolek et al. | 101/480 |
| 2004/0012112 A1 | 1/2004 | Davidson et al. | |
| 2004/0035542 A1 | 2/2004 | Ederer et al. | |
| 2004/0056378 A1 | 3/2004 | Bredt et al. | |
| 2004/0094058 A1 | 5/2004 | Kasperchik et al. | |
| 2004/0104515 A1 * | 6/2004 | Swanson et al. | 264/497 |
| 2005/0017394 A1 | 1/2005 | Hochsmann et al. | |
| 2005/0167872 A1 | 8/2005 | Tsubaki et al. | |
| 2005/0280185 A1 * | 12/2005 | Russell et al. | 264/308 |
| 2007/0057412 A1 * | 3/2007 | Weiskopf et al. | 264/497 |

FOREIGN PATENT DOCUMENTS

| | | |
|---|---|---|
| DE | 4400523 | 7/1995 |
| DE | 4440397 | 9/1995 |
| DE | 19511772 A1 | 10/1996 |
| DE | 19723892 C1 | 9/1998 |
| DE | 19846478 C2 | 4/2000 |
| DE | 19853834 | 5/2000 |
| DE | 10047614 | 4/2002 |
| EP | 0361847 B1 | 4/1990 |
| EP | 0431924 B1 | 6/1991 |
| EP | 0688262 | 12/1995 |
| EP | 0711213 | 5/1996 |
| EP | 0734842 | 10/1996 |
| EP | 0739666 | 10/1996 |
| EP | 0968776 | 1/2000 |
| EP | 1163999 | 12/2001 |
| EP | 1415792 | 5/2004 |
| EP | 1442870 | 8/2004 |
| FR | 2790418 | 9/2000 |
| GB | 2382798 | 6/2003 |
| WO | 95/18715 A1 | 7/1995 |
| WO | 96/05038 A1 | 2/1996 |
| WO | 00/21736 A1 | 4/2000 |
| WO | 00/51809 A1 | 9/2000 |

(56) References Cited

FOREIGN PATENT DOCUMENTS

| WO | 01/26885 A1 | 4/2001 |
|---|---|---|
| WO | 01/72502 A1 | 4/2001 |
| WO | 01/34371 A2 | 5/2001 |
| WO | 02/26419 A1 | 4/2002 |
| WO | 02/26420 A1 | 4/2002 |
| WO | 02/26478 A1 | 4/2002 |
| WO | 02/064353 A1 | 8/2002 |
| WO | 02/064354 A1 | 8/2002 |
| WO | 03/016030 A1 | 2/2003 |
| WO | 03/016067 A2 | 2/2003 |
| WO | 03/103932 A1 | 12/2003 |
| WO | 2004/010907 A1 | 2/2004 |
| WO | 2004/110719 A2 | 12/2004 |
| WO | 2004/112988 A2 | 12/2004 |
| WO | 2005/113219 A1 | 12/2005 |

OTHER PUBLICATIONS

Cima et al., "Computer-derived Microstructures by 3D Printing: Bio- and Structural Materials," SFF Symposium, Austin, TX, 1994.
EOS Operating Manual for Laser Sintering Machine with Brief Summary, Feb. 22, 2005.
Sachs et al., "Three-Dimensional Printing: Rapid Tooling and Prototypes Directly from a CAD Model", Massachusetts Institute of Technology, pp. 131-136, Jun. 27, 2002.
Sachs et al., "Three-Dimensional Printing: Rapid Tooling and Prototypes Directly from a CAD Model", Massachusetts Institute of Technology, pp. 143-151, Jun. 27, 2002.
Jacobs et al., 2005 SME Technical Paper, title "Are QuickCast Patterns Suitable for Limited Production?".
Feature Article—Rapid Tooling—Cast Resin and Sprayed Metal Tooling by Joel Segal, Nov. 21, 2006.
Williams, "Feasibility Study of Investment Casting Pattern Design by Means of Three Dimensional Printing", Department of Machanical Enginerring, pp. 2-15, Sep. 25, 2001.
Copending National Phase Application, WO 02/26419, Apr. 4, 2002.
Copending National Phase Application, WO 02/26420, Apr. 4, 2002.
Copending Patent Application, U.S. Appl. No. 11/320,050, (corresponds with PCT WO 02/26420), (US Patent No. 7,137,431), Dec. 28, 2005.
Copending National Phase Application, WO 03/103932, Dec. 18, 2003.
Copending National Phase Application, WO 2004/112988, Dec. 8, 2005.
Copending National Phase Application, WO 2005/113219, Dec. 1, 2005.
Copending U.S. Appl. No. 10/866,205, (Published as 2005/0017394), Jun. 11, 2004.
Copending U.S. Appl. No. 12/669,063, Jan. 14, 2010.
International Search Report, WO 2004/110719, Jan. 11, 2005.
International Search Report, WO 2005-113219, Dec. 1, 2005.
Gephart, Rapid Prototyping, pp. 118-119, Year 1996.
Marcus et al., Solid Freedom Fabrication Proceedings, Nov. 1993.
Opposition of Patent No. DE10047614, Jun. 25, 2003.
Opposition to European Patent No. 1322458 B1, Jan. 19, 2005.
International Search Report, PCT/DE00/03324, (Published as WO2002/026419), Jun. 5, 2001.
International Search Report, PCT/DE01/03661, (Published as WO2002/026420), Feb. 28, 2002.
International Search Report, PCT/DE01/03662, (Published as WO2002/026478), Mar. 1, 2002.
Marcus, et al., Solid Freeform Fabrication Proceedings, Sep. 1995, p. 130-33.

\* cited by examiner

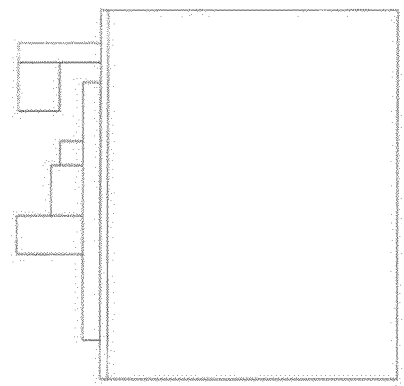
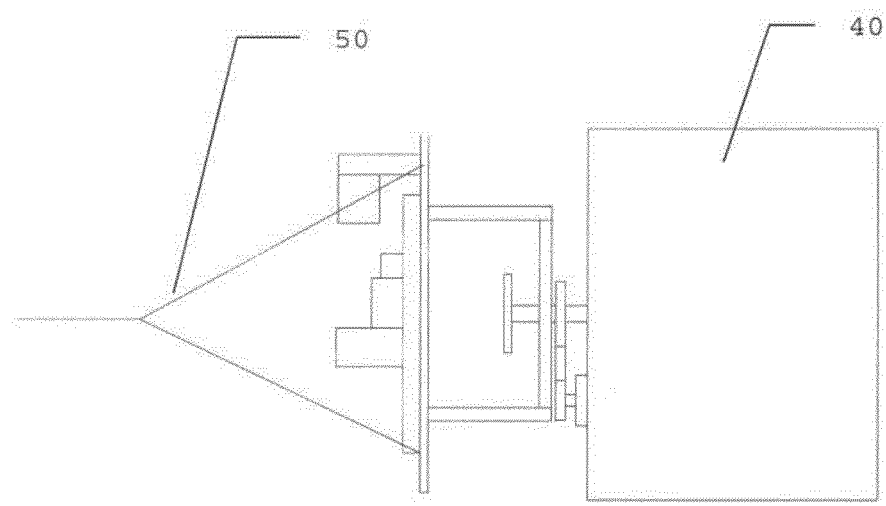
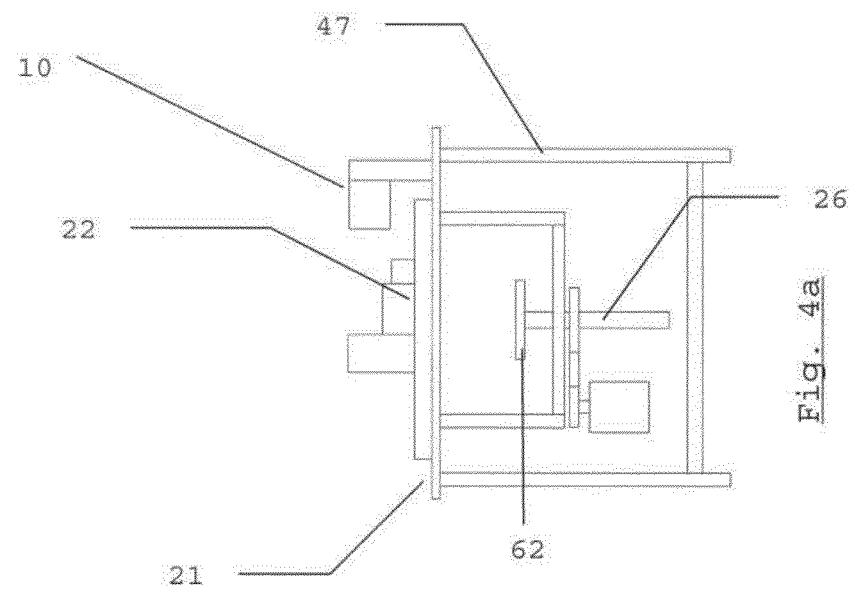

DEVICE FOR THE LAYER-WISE PRODUCTION OF PATTERNS

CLAIM OF PRIORITY

This application is a national phase of PCT application No. PCT/DE2008/001603, filed Oct. 6, 2008, which claims priority to German Application No. DE 10 2007 050 953.9, filed Oct. 23, 2007, all of which are incorporated by reference herein.

FIELD OF THE INVENTION

The present invention relates to a device for manufacturing patterns in layers, which encompasses a mounting plate, guides for moving a spreader device and a drop dispensing system, a vertically displaceable and exchangeable build platform as well as a material feeding device, wherein the main elements of the device are mounted to the mounting platform before it is introduced into a housing and is fixed therein. The present invention further relates to use of such a device.

BACKGROUND

Today, the development of components represents new demands on the producing industry. The increasing time and cost pressure can be confronted in that new methods, such as rapid prototyping and rapid tooling are used.

A method (Object) is thus known, for example, where a polymeric material, which can be hardened, is applied in the form of liquid droplets onto a vertically displaceable build platform or workpiece platform selectively within a contour of the corresponding cross section of the desired object by means of a displaceable dispensing device and is hardened by means of UV radiation. The desired component is created layer by layer by means of repeated application. The object is subsequently removed from the build platform.

In the case of another method, a layer of a free-flowing particulate material is settled in an area on a build table. A binder material in the form of liquid droplets is then applied onto the layer of particulate material in a selected partial area by means of a displaceable dispensing device. Binder material and particulate material form a solidified structure. Further layers are in each case formed by repeating the aforementioned steps. The solidified structure is then separated from non-solidified portions of the particulate material.

Different devices are known to carry out such so-called rapid prototyping methods, which are known from the state of the art.

A typical embodiment of a device according to DE0010047614, e.g., consists of a welded tube frame supporting adapted guide tracks. Such frames are joined from a plurality of elements and are set up extensively. Due to the fact that the joining areas are located around the frame parts, the component parts must be fully machined all around. The casing is then hung on the completely mounted device and thereby does not have any supporting function.

A very simple device, which substantially consists of profiled sheet metal parts, to which simple rod guides are screwed directly, is known from WO20030160667. At any rate, this embodiment has limitations with reference to the device accuracy and is thus only suitable for smaller device dimensions, because the guide deviations do not stand out so much in that case. However, it has proven to be disadvantageous in the case of all of the devices known from the state of the art and from practice that the mounting and adjusting of the system is time-intensive and expensive.

SUMMARY OF THE INVENTION

According to the invention, this objective is solved in the case of a device for manufacturing patterns of the aforementioned type in layers by using a mounting plate, to which all of the process-relevant positioning units and conveying devices are mounted before the mounting plate together with the attached devices is introduced into a housing and is fixed therein.

For this, the mounting plate encompasses cut-outs for the build platform, the powder supply and removal as well as for maintenance units for the drop dispensing apparatus, such as cleaning and capping station, e.g.

In addition, the mounting plate encompasses fastening possibilities for the positioning axes of the drop dispensing unit and the spreader device as well as for the positioning unit of the build platform.

The mounting plate is thereby dimensioned in such a manner that, when being fixed on only a few points, it does not deform or only within narrow margins, so as to ensure the accuracy in the case of the application mechanisms.

This applies in particular for the stress caused by weight of the attached units and weight of the particulate material on the build platform during the layering process.

The mounting platform is thereby embodied as a plane plate, e.g. of a fully machined aluminum plate.

The build platform is located in a construction cylinder, which is advantageously embodied as an exchangeable container. The construction cylinder contains a build platform, which can be moved in the direction of the cylinder and which cannot slip out of the construction cylinder in its lower end position. On its lateral edge facing the wall of the construction cylinder, the build platform encompasses a seal, which keeps the applied particulate material from flowing by. To introduce the weight forces of the exchangeable container and the additional friction forces caused by the friction between build platform and exchangeable container wall into the mounting plate in the shortest possible way, a guide for the exchangeable container is located on the underside of the mounting plate. The exchangeable container in turn encompasses guide elements on the two opposite upper ends on the outsides of the construction cylinder.

Via these guide elements, the exchangeable container can easily be introduced into the device and is thereby fixed in vertical direction. Roller guides, e.g., are suitable as guide elements. The rollers can be arranged on the underside of the mounting platform along the introduction path of the exchangeable container, e.g. The exchangeable container then again encompasses a matching guide rail, which engages with the rollers in a positive manner or encloses them in a positive manner.

Advantageously, a stop, which defines an end position of the exchangeable container in the device, is located at the end of the introduction path. After introduction into the device, the exchangeable container is fixed by means of a holding device.

The movement of the build platform takes place via a vertical hoisting mechanism, which is orthogonally attached to the mounting plate. The hoisting mechanism can consist of one or a plurality of threaded spindles, e.g., which are mounted in an intermediate platform so as to be pivot-mounted in spindle nuts, with said intermediate platform being located below the build platform. The threaded spindles can be actuated via a common belt drive and a servomotor.

When using two or a plurality of simultaneously operating spindles, an additional guide of the hoisting mechanism can become unnecessary, because the build platform can be sufficiently fixed in its position with said spindles and all moments of tilt are sufficiently discharged. The intermediate platform can then be fastened to the mounting platform via spacer plates, e.g. In the alternative, the hoisting mechanism can also be affixed on the side of the exchangeable container and can then be equipped with guide elements, such as rails comprising guide carriages, e.g. The build platform in the exchangeable container is then connected to the hoisting system in a non-positive manner via a coupling element. This can be, e.g., a pneumatically actuated zero point clamping system, as it is known from tooling machines. All of the displacement movements are transferred onto the build platform via the coupling and all forces and moments acting on the build platform, such as, e.g. frictional forces of the seal between container wall and platform, densification forces in response to the layer application and gravitational forces are in turn guided into the hoisting system by means of the particulate material. The axes for the movement of the spreader unit and for the drop dispensing apparatus are mounted on the mounting plate. Axes refer to combinations of guide system and drive. The guide task can be fulfilled by rails and carriages, e.g. wherein the carriages comprising recirculating ball systems rolling on the rail.

The drop dispensing apparatus is typically moved across the build field in a meander-style during the layering process. This movement is reached by means of a system of axes, which are aligned orthogonally to one another. Due to the dimension of the build field, a pair of axes to be arranged along the opposite sides of the build field is usually necessary to support a further axis as connection.

The movement requires a most constant speed across the long displacement distance (X-axis) and accurate positioning across the short displacement distance (Y-axis). To minimize masses moved and wear of the axes, it proves to be advantageous for the individual axis to form the X-axis and for the pair of axes to serve as Y-axis.

In the process, the drop dispensing apparatus preferably operates only in the area of constant speed in response to movement across the X-axis, so as to locally meter the drops accurately onto the build field. The drops are thus released here conform to impulses of a measuring unit system attached to the X-axis. A belt drive axis, providing an even run, can be used as movement system. Alternatively a threaded spindle axis be used. Due to the better positioning in this case, a linear measuring system is not necessary and can be replaced by an encoder mounted to the motor. Last but not least, a linear drive, as it is increasingly found in tooling machines, can also be used. The Y-axis, however, must position accurately, which requires a threaded spindle drive or a linear drive.

The spreader apparatus, however, needs to be moved across the construction field at a speed, as constant as possible, while releasing particulate material onto the build platform. Belt drives as well as threaded spindle drives as well as linear drives are suitable for this kind of movement.

The axes arrangement for the spreader apparatus may not collide with the axes for the drop dispensing apparatus. Due to the size of the build field and to reduce moment loading onto an axis, it is likely to use a pair of axes, which is arranged parallel to the Y-axis of the drop dispensing apparatus.

To simplify the apparatus, it is possible to have no separate pair of axes for the spreader apparatus and using the Y-axis pair for the drop dispensing apparatus as well as for the spreader apparatus simultaneously instead. This takes place by mounting the spreader device onto the guide carriages of the Y-axis next to the X-axis.

A feeder mechanism for refilling the spreader apparatus with particulate material is located at the end of the displacement distance. This material feed preferably takes place by means of a conveying system, which is operated from a particulate material reservoir below the mounting platform or outside of the device. In addition, a further particulate material reservoir is available below the mounting platform for excess particulate material, which is pushed above the edge of the build platform by means of the spreader unit. This particulate quantity is preferably discharged through an ejection slit in the mounting platform when the spreader unit moves across it.

A further ejection slit is located on the opposite side of the construction field at the beginning of the travel of the spreader device.

The device can be closed by means of a casing. For safety reasons, there is a need for a hood, which protects the user from particulate dusts and process vapors and which prevents accidental contact to moving parts, in particular in the processing room above the mounting platform. This hood should be movable in such a manner so as to allow the best possible access to the elements of the device during standstill. A flap mechanism, which makes it possible to open the hood, is suitable for this purpose. The flap mechanism can be affixed directly to the mounting platform. A seal introduced into the mounting platform further shields the processing room from the environment.

To further shield the processing room from the underside of the mounting platform, the introduction path for the exchangeable container can be covered by a housing. A door arranged at the beginning of the introduction path closes the introduction path during the process.

When the mounting platform is dimensioned to be sufficiently large so as to cover the outer edge of a casing located there below, the processing room can thus be sealed sufficiently towards the bottom.

The casing below the mounting platform can be embodied in such a manner that it simultaneously functions as a rack and supports the mounting platform. In an advantageous embodiment, the casing consists of a single component, which encloses the device, e.g. of profiled and welded sheet metal parts, which accommodates the mounting platform.

Component assemblies, such as control cabinet, fluid and compressed air supply, can be accommodated in a space-saving manner in the enclosed room below the mounting platform.

Due to the embodiment of the mounting platform as a plane plate, the effort for orienting the pair of axes to one another is minimized. Only the parallelism of the axes must be checked. Simple stops of the axes can be introduced into the mounting plate by means of alignment pins and can provide for the correct position of the axes at least on one side. In response to a sufficient dimensioning of the mounting platform, the casing at the accommodation of the mounting platform must not be machined, which considerably reduces the production costs. To fasten the mounting plate, only vertically displaceable fastening elements must then be used at different locations, to adjust the distance of the mounting platform to the casing.

To simplify the mounting of the device, all attachment parts can be mounted, adjusted and wired to the mounting plate while placed outside of the casing. Preferably, this takes place on a separate simple mounting rack. The accessibility is thereby better than in the fully assembled state in the casing.

A preferred embodiment will be described below by means of the drawings.

It is thus objective of the present invention to provide a device for manufacturing patterns in layers, which is as accurate as possible, easy to mount and yet cost-effective to make.

Accordingly, pursuant to a first aspect of the present invention, there is contemplated a device for manufacturing patterns in layers, encompassing a vertically displaceable build platform, a dispensing device for applying binder material onto the build platform, wherein the device additionally encompasses a mounting platform, to which all displacement units for the dispensing device and for the build platform are affixed.

The first aspect of the present invention may be further characterized by one or any combination of the features described herein, such as a spreader device for applying fluid is provided; all displacement units of the spreader device are further affixed to the mounting platform, the dispensing device and/or the spreader device are further affixed to the mounting plate.

DESCRIPTION OF THE DRAWINGS

FIGS. 4a-4c shows the introduction of the mounting platform into the casing.

DETAILED DESCRIPTION OF THE INVENTION

Figure 1:
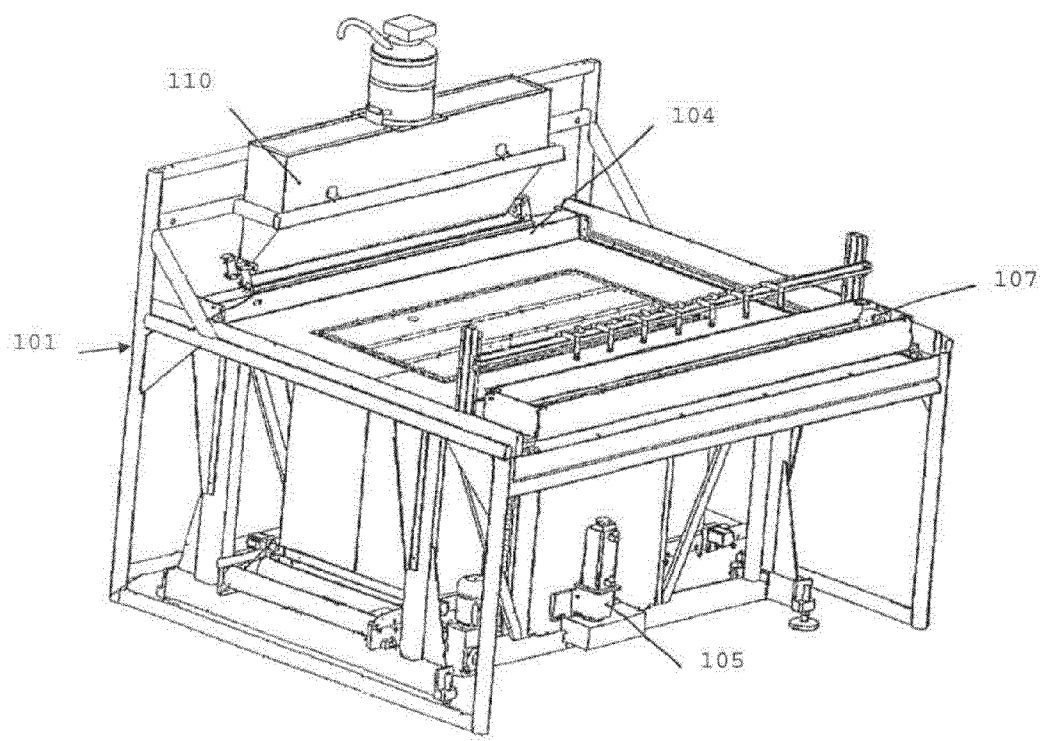
FIG. 1 shows an embodiment of the device as a tube frame (state of the art).

FIG. 1 shows a device for three-dimensional printing according to the state of the art without an attached casing. The surrounding tube frame 101, which supports the individual guides for the elements such as the spreader device 104, X-axis 107, Z-axis 105, and the material feeder 110.

Figure 2:
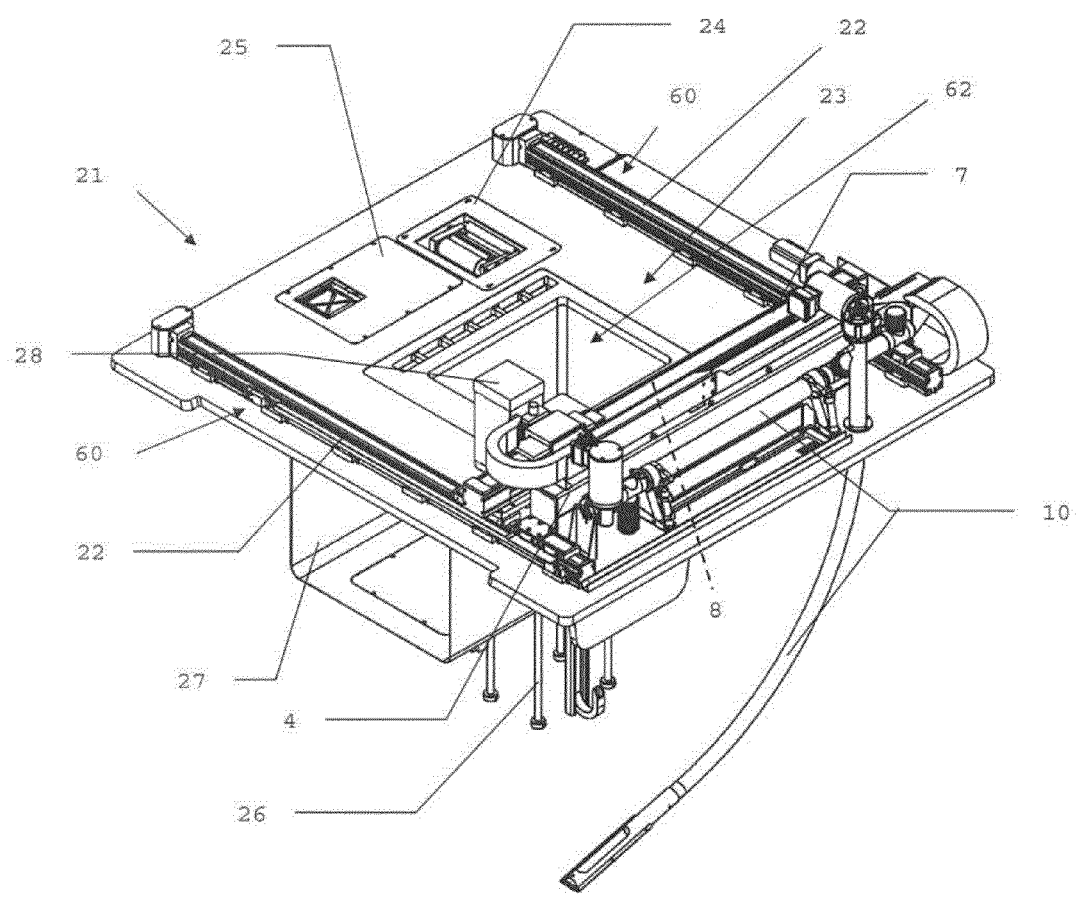
FIG. 2 shows a diagonal view onto the partially mounted mounting platform.

FIG. 2 shows the mounting platform 21 according to the present invention comprising the attachment parts. A pair of guide carriages 22 are fixed to the opposite sides of the construction field cut-out 23 and the mounting platform along a Y-axis 60. The print head 28 is mounted to a carriage 8 that is attached to and spans between the pair of guide carriages 22 along the print head axis 7. The spreader device 4 is also guided on the pair of guide carriages 22 along the Y-axis 60. The material feeder 10 is located in the front part of the mounting platform 21. The cleaning station 24 for the print head 28 can be seen in the front area. Next to it is the capping station 25, which closes the print head 28 during standstill and which thus prevents a drying or soiling of the print head 28. The spreader device and the dispensing device (e.g., the print head) preferably are positioned entirely above the mounting platform.

The build platform 62 is mounted below the mounting platform along a Z-axis 26. The introduction room for the exchangeable container 2 (not shown) is shielded by means of the casing 27.

Figure 3:
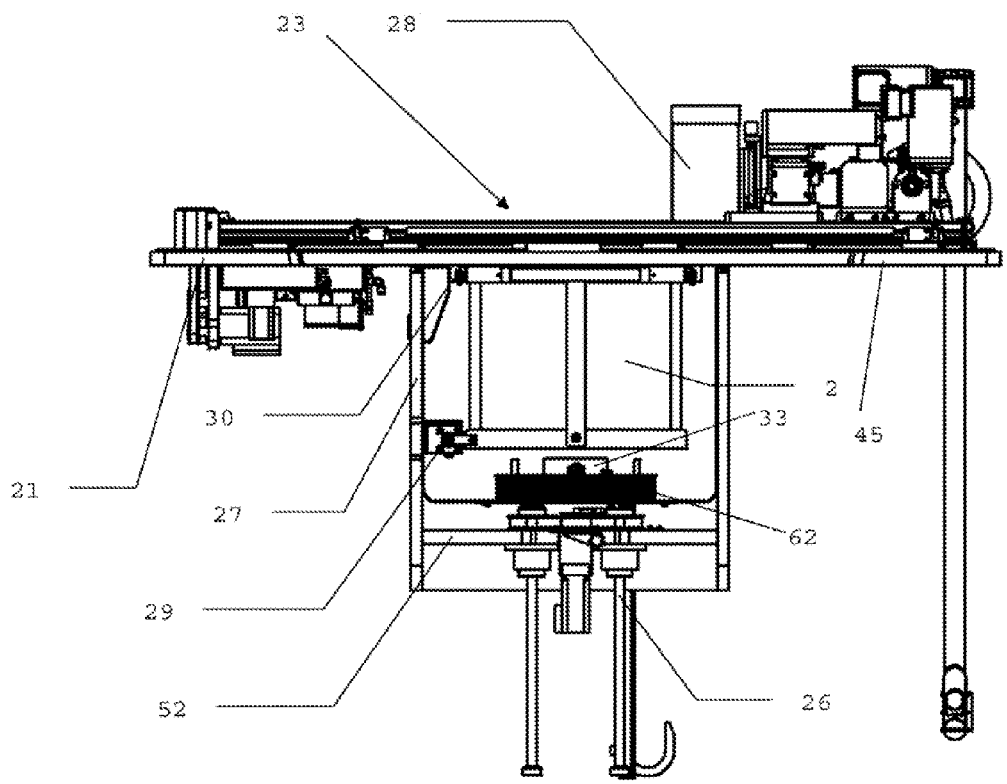
FIG. 3 shows a front view of the mounting platform comprising attached axes.

FIG. 3 shows the mounting platform 21 comprising the attachment parts in side view. In this position, the exchangeable container 2 can be seen, which is introduced via the guide 30 at the mounting platform underside so as to be displaceable only in horizontal direction up to the position below the construction field cut-out 23 and is then held in position via the catch 29. In this embodiment, the build platform 62 consists of four simultaneously driven threaded spindles, which are supported in the intermediate platform 52 along the Z-axis 26. It is fixed to the mounting platform 21 via the casing 27. The mounting platform may include or consist of a mounting plate 45. The construction field cut-out 23 creates an opening that is sufficiently larger for the construction field 33 to pass through during the build process.

FIG. 4 shows the mounting process of the preassembled mounting platform 21 in the image sequence shown in FIGS. 4a to 4c into the chamber 40. The attachment parts such as a pair of guide carriages 22, material feeder 10, and a build platform 62 movable along the Z-axis 26, e.g., are mounted to the mounting platform 21 (FIG. 4a), while said mounting platform 21 rests on an auxiliary frame 47, which allows for the best possible accessibility. Subsequently (FIG. 4b), the preassembled mounting platform 21 is lifted into the provided chamber 40, e.g. from the auxiliary frame 47 by means of crane splices 50. Finally (FIG. 4c), the mounting platform 21 is connected to the chamber 40 by means of screwing and the cap 41 (not shown) is placed thereon.

Figure 5:
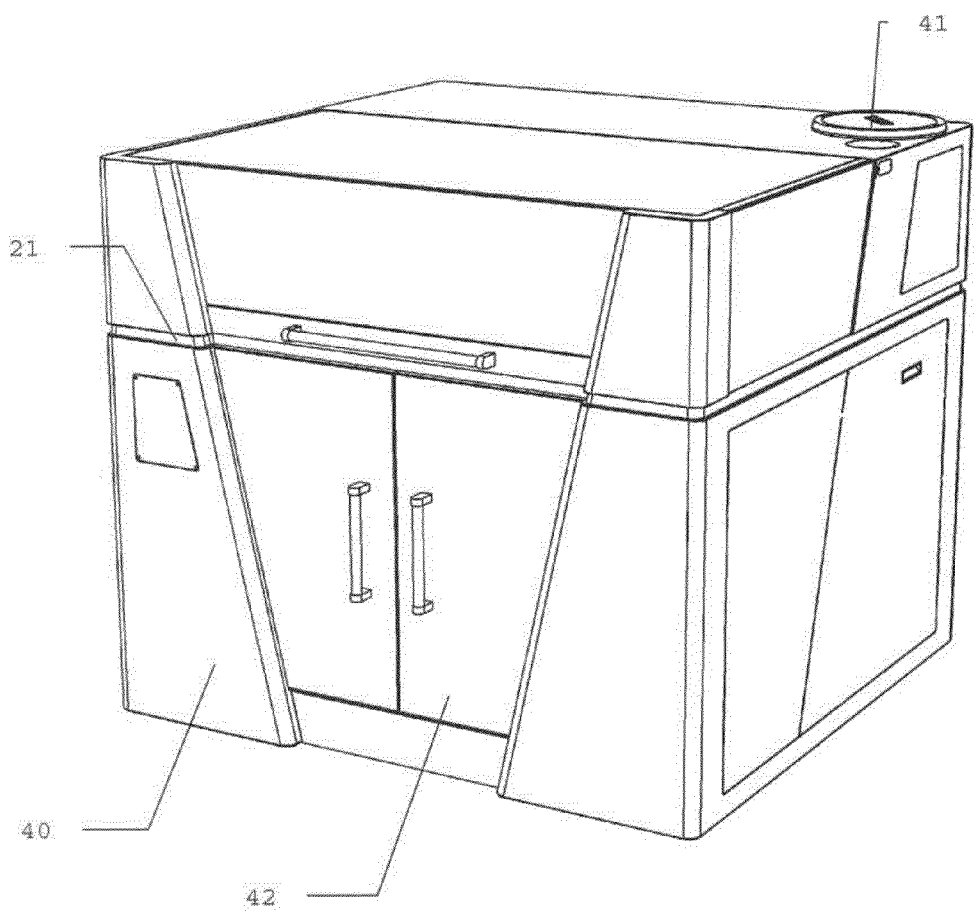
FIG. 5 shows the mounted device in the diagonal view.

FIG. 5 then shows the completely mounted device comprising a chamber 40, mounting platform 21 and cap 41. Doors 42 to cover the introduction space for the exchangeable container 2 are located below the mounting platform 21.

The invention claimed is:

1. A device for manufacturing patterns in layers comprising:
    a) an auxiliary frame;
    b) a vertically displaceable build platform,
    c) a dispensing device configured to apply a binder material onto the build platform,
    d) a mounting platform, and
    e) a spreader device configured to apply particulate material onto the build platform;
    wherein the mounting platform includes a construction field cut-out for the build platform and is connected to the auxiliary frame and
    wherein the dispensing device and the spreader device are affixed to the mounting platform via guide carriages and are both positioned entirely above the mounting platform, and the build platform is mounted below the mounting platform, and the device includes an intermediate plate located below the build platform, the build platform is moved by a vertical hoisting mechanism that is orthogonally attached to the mounting platform, and the vertical hoisting mechanism is mounted to the intermediate plate.

2. The device according to claim 1, wherein the guide carriages includes a pair of guide carriages fixed to opposite edges of the mounting platform.

3. The device according to claim 2, wherein the mounting platform includes a mounting plate, and the dispensing device, the spreader device, or both are affixed to the mounting plate via the pair of guide carriages, and the construction field cut-out provides an opening for a construction field of the build platform during the manufacturing of patterns in layers.

4. The device according to claim 2, wherein the dispensing device is mounted on a carriage that is mounted to the pair of guide carriages.

5. The device according to claim 2, wherein the dispensing device is mounted on a carriage that travels along the pair of guide carriages in a direction along a Y-axis, and the dispensing device travels along the carriage in a direction along an X-axis;
    wherein the X-axis and the Y-axis are perpendicular.

6. The device of claim 2, wherein the spreader device is mounted onto the pair of guide carriages.

7. The device of claim 1, wherein a feeder mechanism configured to refill the spreader device is mounted to the mounting platform.

8. The device of claim 1, wherein a cleaning station and a capping station are located in the mounting platform.

9. The device of claim 8, wherein the capping station is located in the mounting platform next to the cleaning station so that the capping station closes the dispensing device during a standstill preventing drying or soiling of the dispensing device.

10. The device of claim 1, wherein the mounting platform is a plane plate.

11. The device of claim 10, wherein a construction cylinder is connected to the mounting platform, the construction cylinders below the mounting platform, and the build platform is in the construction cylinder so that the build platform is moved in a direction of the construction cylinder and so that the build platform does not slip out of the construction cylinder in a lowered position.

12. The device of claim 11, wherein the build platform encompasses a seal between the construction cylinder and the build platform so that applied particulate material is prevented from flowing from the build platform.

13. The device of claim 10, wherein the build platform encompasses a seal so that applied particulate material is prevented from flowing from the build platform.

14. The device of claim 1, wherein an exchangeable container including the vertically displaceable build platform is connected to an underside of the mounting platform via a guide and the device includes a catch for holding the exchangeable container in place during use.

15. The device of claim 11, wherein the construction cylinder is an exchangeable container, the device includes guide elements under and attached to the mounting plate for introducing the exchangeable container.

16. The device of claim 15, wherein the device includes a covered chamber below the mounting platform, wherein the covered chamber surrounds the exchangeable container.

17. The device of claim 16, wherein the covered chamber includes doors for introducing the exchangeable container below the mounting platform.

18. A device for manufacturing patterns in layers comprising:
   a) an auxiliary frame;
   b) vertically displaceable build platform,
   c) a dispensing device configured to apply a binder material onto the build platform,
   d) a mounting platform, and
   e) a spreader device configured to apply particulate material onto the build platform;
   wherein the mounting platform includes a construction field cut-out for the build platform and is connected to the auxiliary frame;
   the dispensing device and the spreader device are affixed to the mounting platform via guide carriages and are both positioned entirely above the mounting platform, and the build platform is mounted below the mounting platform;
   an exchangeable container including the vertically displaceable build platform is connected to an underside of the mounting platform via a guide and the device includes a catch for holding the exchangeable container in place during use;
   the exchangeable container is located above an intermediate platform that is connected to the mounting platform via a casing, and
   a plurality of threaded spindles extend between the intermediate platform and the build platform so that the plurality of threaded spindles move the build platform.

19. The device according to claim 18, wherein
   the guide carriages includes a pair of guide carriages fixed to opposite edges of the mounting platform,
   the mounting platform includes a mounting plate, the dispensing device and the spreader device are both affixed to the mounting plate via the pair of guide carriages, and
   the construction field cut-out provides an opening for a construction field of the build platform during the manufacturing of patterns in layers, and
   a feeder mechanism configured to refill the spreader device is mounted to the mounting platform.

20. The device of claim 18, wherein a cleaning station and a capping station are located in the mounting platform.

21. The device of claim 18, wherein the device includes an intermediate platform located below the build platform, the build platform is moved by a vertical hoisting mechanism that is orthogonally attached to the mounting platform, and the vertical hoisting mechanism is mounted to the intermediate platform.

22. The device of claim 21, wherein the vertical hoisting mechanism includes a plurality of threaded spindles.

* * * * *